(12) United States Patent
Polyulya et al.

(10) Patent No.: US 11,556,241 B2
(45) Date of Patent: *Jan. 17, 2023

(54) APPARATUS AND METHOD OF COPYING AND PASTING CONTENT IN A COMPUTING DEVICE

(71) Applicant: SAMSUNG ELECTRONICS CO., LTD., Suwon-si (KR)

(72) Inventors: Yuriy Polyulya, Kyiv (UA); Aleksandra Peteichuk, Tiachiv (UA); Olesya Koshkina, Sarny (UA); Stanislav Kupchanko, Luzhany (UA)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/950,970

(22) Filed: Nov. 18, 2020

(65) Prior Publication Data
US 2021/0089201 A1 Mar. 25, 2021

Related U.S. Application Data

(63) Continuation of application No. 15/100,488, filed as application No. PCT/KR2014/011025 on Nov. 17, 2014, now Pat. No. 10,871,894.

(30) Foreign Application Priority Data

Jan. 10, 2014 (KR) .................. 10-2014-0003608

(51) Int. Cl.
*G06F 3/04842* (2022.01)
*G06F 40/166* (2020.01)
(Continued)

(52) U.S. Cl.
CPC ........ *G06F 3/04883* (2013.01); *G06F 3/0416* (2013.01); *G06F 3/0488* (2013.01);
(Continued)

(58) Field of Classification Search
None
See application file for complete search history.

(56) References Cited

U.S. PATENT DOCUMENTS

| 6,470,341 B1 | 10/2002 | Rekimoto |
| 6,961,907 B1 | 11/2005 | Bailey |

(Continued)

FOREIGN PATENT DOCUMENTS

WO 2010/114251 A2 10/2010

OTHER PUBLICATIONS

Search Report dated Feb. 11, 2015, issued by the International Searching Authority in counterpart International Application No. PCT/KR2014/011025 (PCT/ISA/220, 210).

(Continued)

*Primary Examiner* — Henry Orr
(74) *Attorney, Agent, or Firm* — Sughrue Mion, PLLC

(57) ABSTRACT

A method of copying content in a computing device includes detecting a gesture of an input tool which selects content to be copied that is displayed on a display of the computing device while the input tool operates within a sensing range of a proximity sensor of the computing device, and automatically copying the selected content to a clipboard in response to detecting removal of the input tool from within the sensing range of the proximity sensor.

16 Claims, 13 Drawing Sheets

(51) Int. Cl.
*G06F 3/04883* (2022.01)
*G06F 3/0488* (2022.01)
*G06F 3/041* (2006.01)
*G06F 3/04845* (2022.01)
*G06F 9/451* (2018.01)

(52) U.S. Cl.
CPC ...... *G06F 3/04842* (2013.01); *G06F 3/04845* (2013.01); *G06F 9/451* (2018.02); *G06F 40/166* (2020.01); *G06F 2203/04108* (2013.01)

(56) References Cited

U.S. PATENT DOCUMENTS

| | | |
|---|---|---|
| 2006/0010400 A1 | 1/2006 | Dehlin et al. |
| 2008/0005703 A1 | 1/2008 | Radivojevic et al. |
| 2009/0228792 A1* | 9/2009 | van Os ............... G06F 3/04842 |
| | | 715/702 |
| 2009/0247234 A1 | 10/2009 | Kim |
| 2010/0107099 A1 | 4/2010 | Frazier et al. |
| 2010/0235726 A1 | 9/2010 | Ording et al. |
| 2011/0163968 A1 | 7/2011 | Hogan |
| 2011/0242043 A1 | 10/2011 | Yarvis et al. |
| 2011/0258357 A1 | 10/2011 | Rives et al. |
| 2011/0258537 A1 | 10/2011 | Rives et al. |
| 2012/0030567 A1 | 2/2012 | Victor |
| 2012/0030568 A1* | 2/2012 | Migos ............... G06F 3/0486 |
| | | 715/702 |
| 2012/0081317 A1* | 4/2012 | Sirpal ............... G06F 3/04847 |
| | | 345/173 |
| 2012/0162213 A1 | 6/2012 | Shim et al. |
| 2012/0223912 A1 | 9/2012 | Kim |
| 2012/0246594 A1 | 9/2012 | Han et al. |
| 2012/0289290 A1 | 11/2012 | Chae et al. |
| 2012/0302167 A1 | 11/2012 | Yun et al. |
| 2012/0319991 A1 | 12/2012 | Yang et al. |
| 2013/0055131 A1* | 2/2013 | Leong ............... G06F 3/0484 |
| | | 715/770 |
| 2013/0110974 A1 | 5/2013 | Arrasvuori et al. |
| 2013/0265437 A1 | 10/2013 | Thorn et al. |
| 2013/0321340 A1* | 12/2013 | Seo ............... G06F 3/1438 |
| | | 345/174 |
| 2014/0011547 A1 | 1/2014 | Jingushi et al. |
| 2014/0013258 A1 | 1/2014 | Jang et al. |
| 2014/0157169 A1* | 6/2014 | Kikin-gil ............... G06F 3/0486 |
| | | 715/770 |
| 2014/0210744 A1 | 7/2014 | Song et al. |
| 2014/0258905 A1 | 9/2014 | Lee et al. |
| 2014/0267078 A1 | 9/2014 | Kukulski et al. |
| 2014/0325383 A1* | 10/2014 | Brown ............... G06F 3/017 |
| | | 715/748 |

OTHER PUBLICATIONS

Communication dated Oct. 23, 2017, issued by the European Patent Office in counterpart European Application No. 14878250.1.
Communication dated Apr. 19, 2017, issued by the European Patent Office in counterpart European Application No. 14878250.1.
Written Opinion dated Feb. 11, 2015, issued by the International Searching Authority in counterpart International Application No. PCT/KR2014/011025 (PCT/ISA/237).
Cheng, et al.; "Contactless Gesture Recognition System Using Proximity Sensors", IEEE International Conference on Consumer Electronics (ICCE), Jan. 2011, 2 pages total.
Notice of Allowance issued in parent U.S. Appl. No. 15/100,488 dated Aug. 21, 2020.
Final Office Action issued in parent U.S. Appl. No. 15/100,488 dated Jun. 9, 2020.
Office Action issued in parent U.S. Appl. No. 15/100,488 dated Nov. 18, 2019.
Final Office Action issued in parent U.S. Appl. No. 15/100,488 dated Aug. 5, 2019.
Office Action issued in parent U.S. Appl. No. 15/100,488 dated Feb. 7, 2019.
Final Office Action issued in parent U.S. Appl. No. 15/100,488 dated Sep. 13, 2018.
Office Action issued in parent U.S. Appl. No. 15/100,488 dated Feb. 28, 2018.

\* cited by examiner

[Fig. 1A]
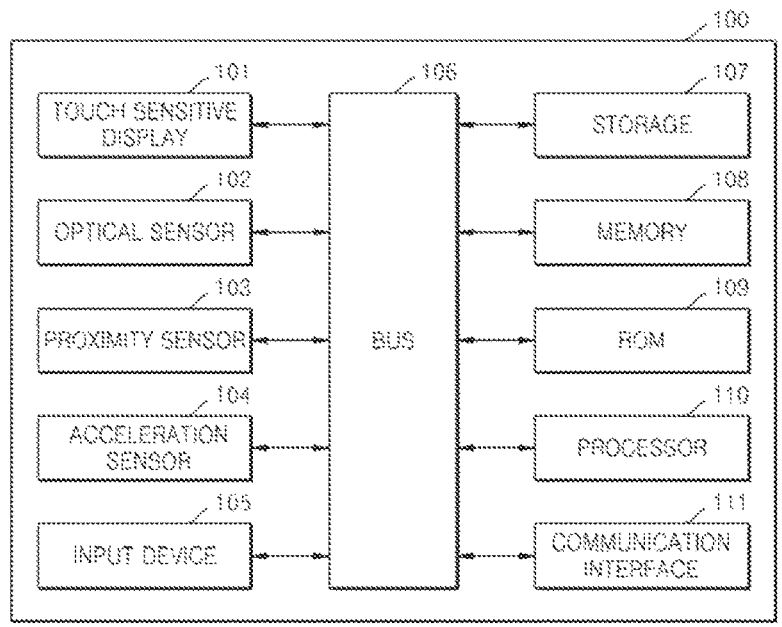
[Fig. 1B]
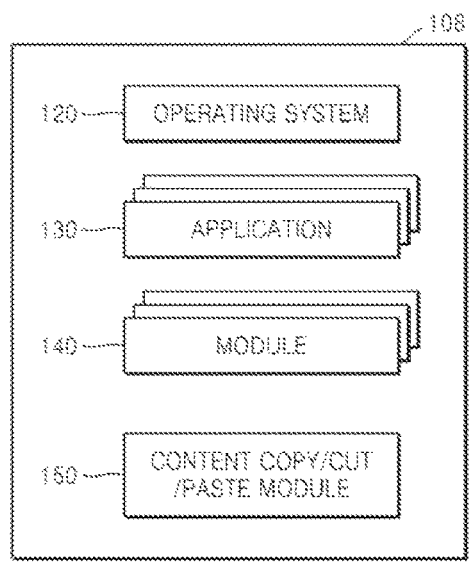
[Fig. 2]
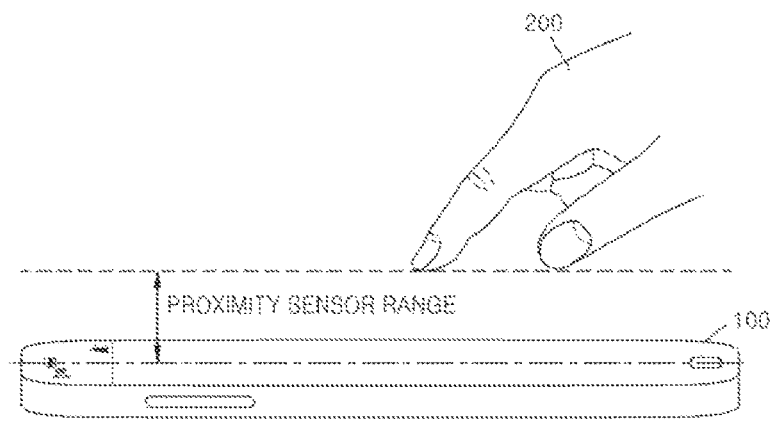

[Fig. 3]
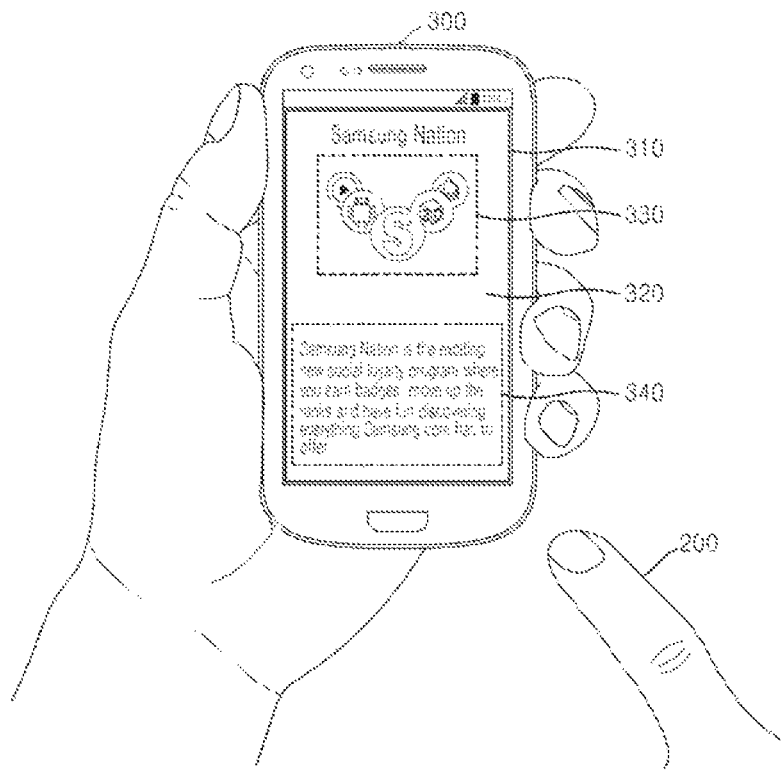
[Fig. 4]
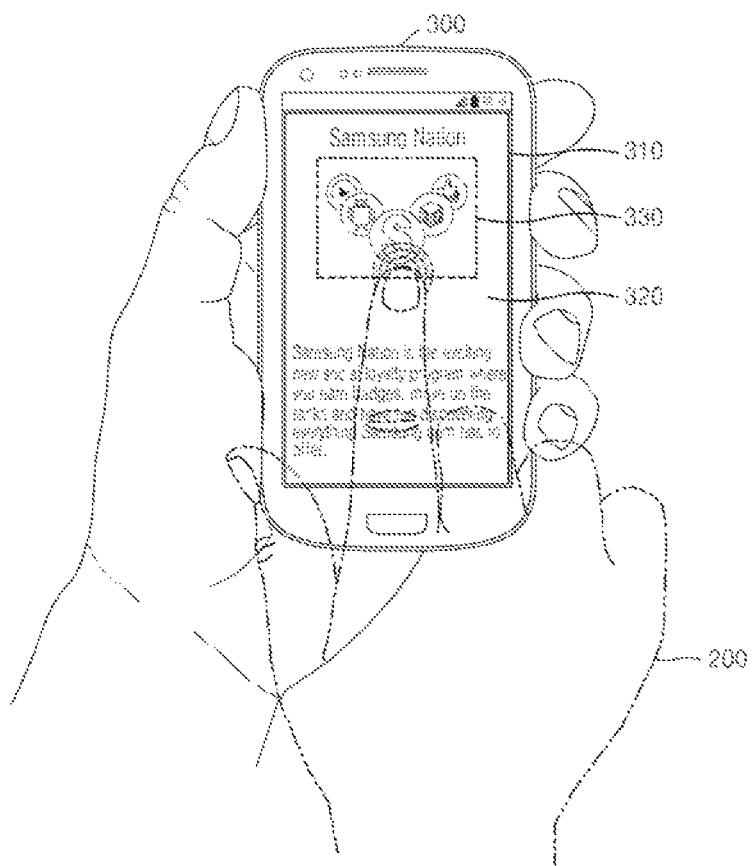

[Fig. 5A]
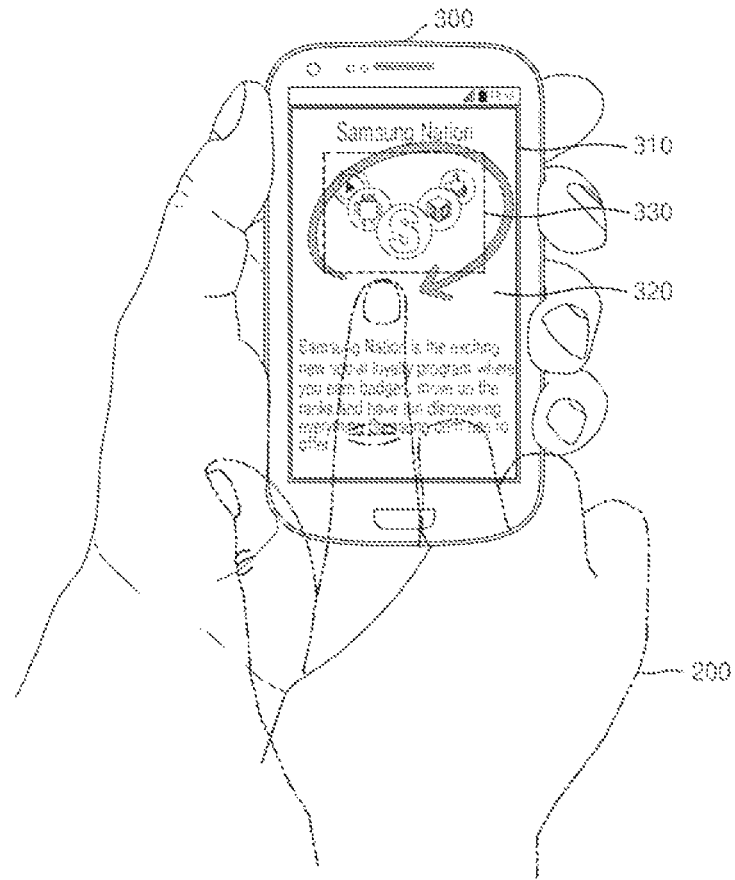
[Fig. 5B]
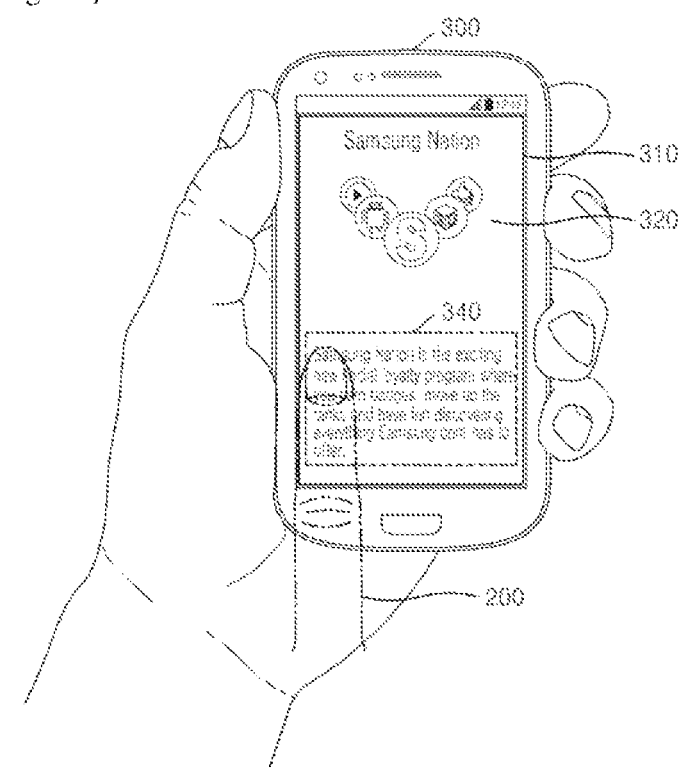

[Fig. 5C]
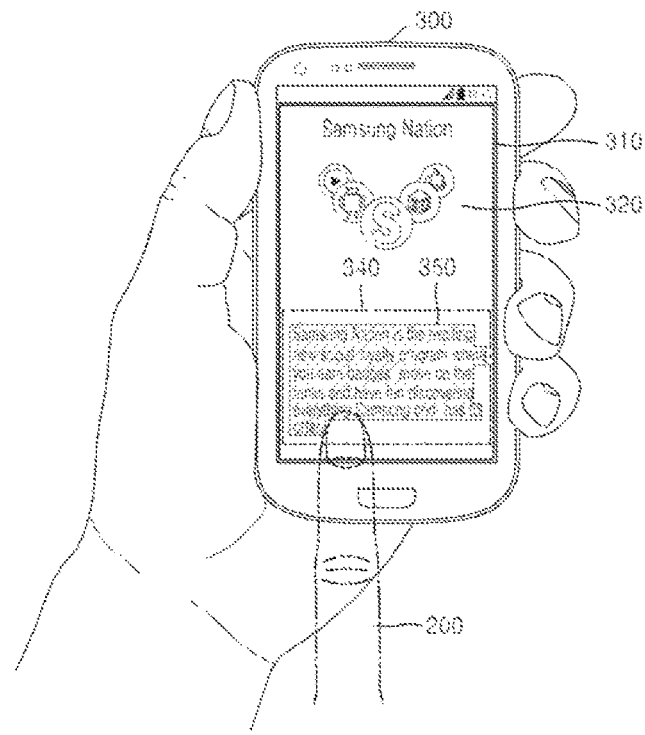
[Fig. 6A]
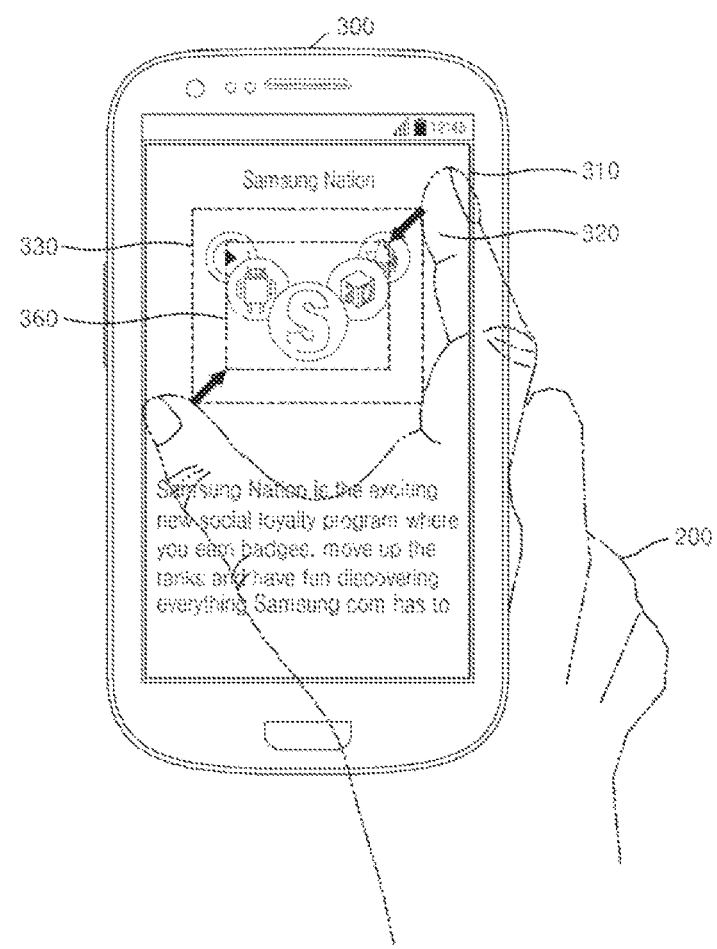

[Fig. 6B]
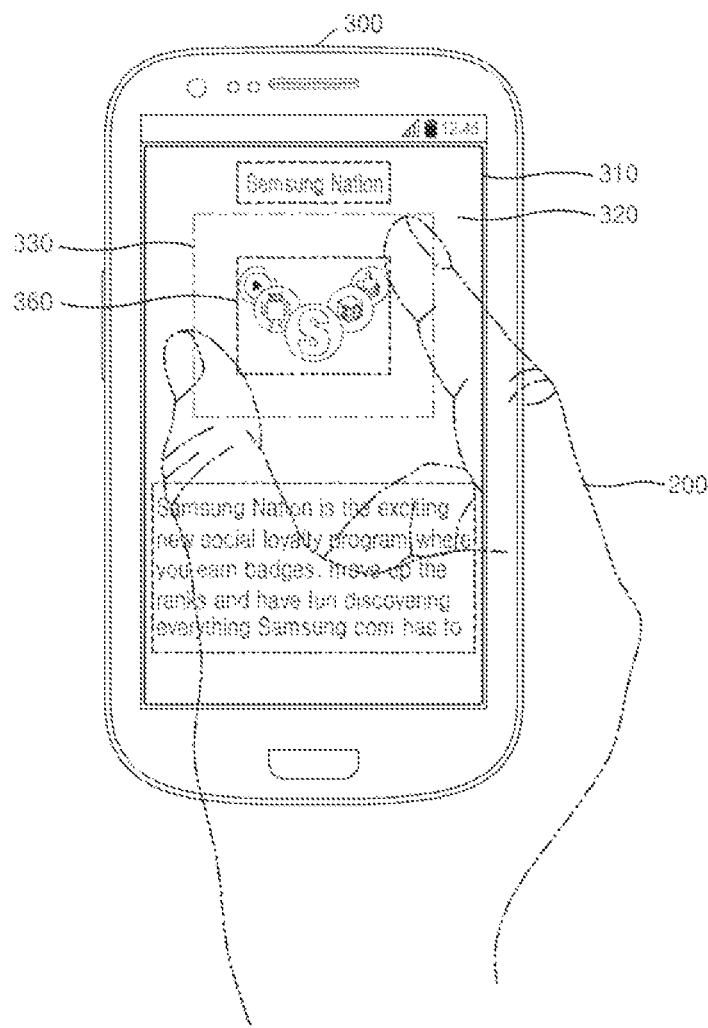
[Fig. 7]
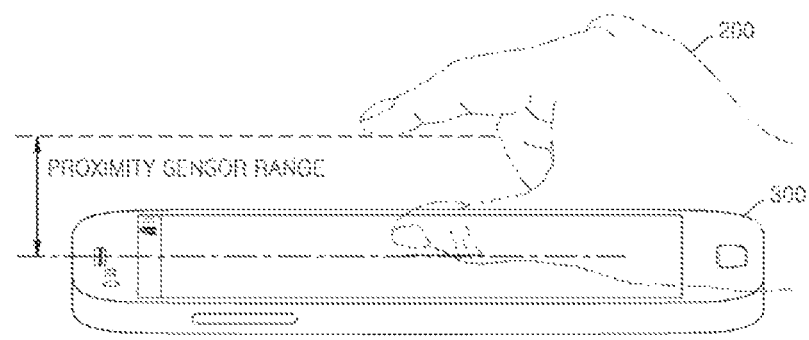

[Fig. 8]
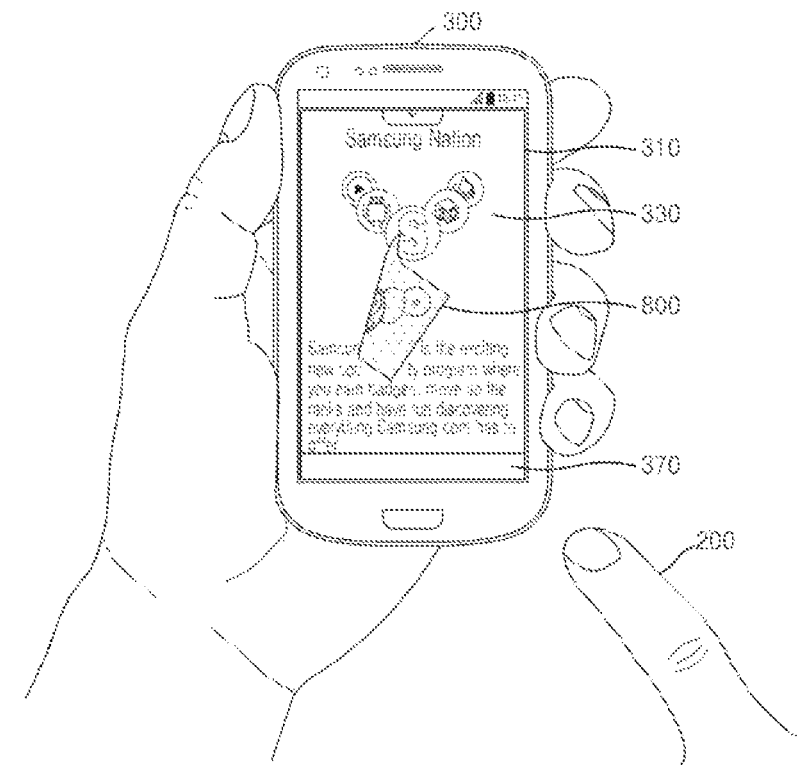
[Fig. 9A]
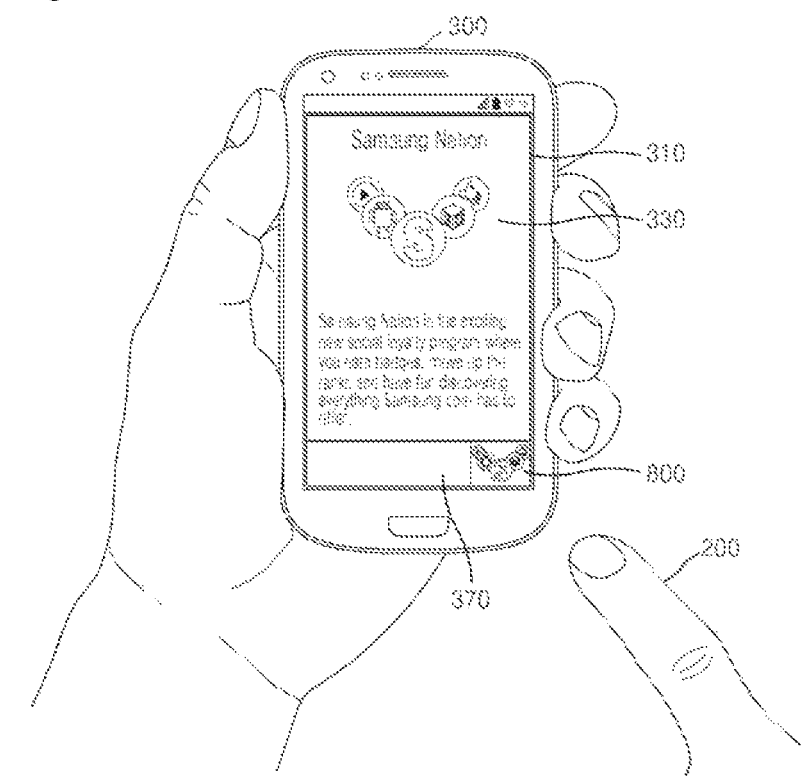

[Fig. 9B]
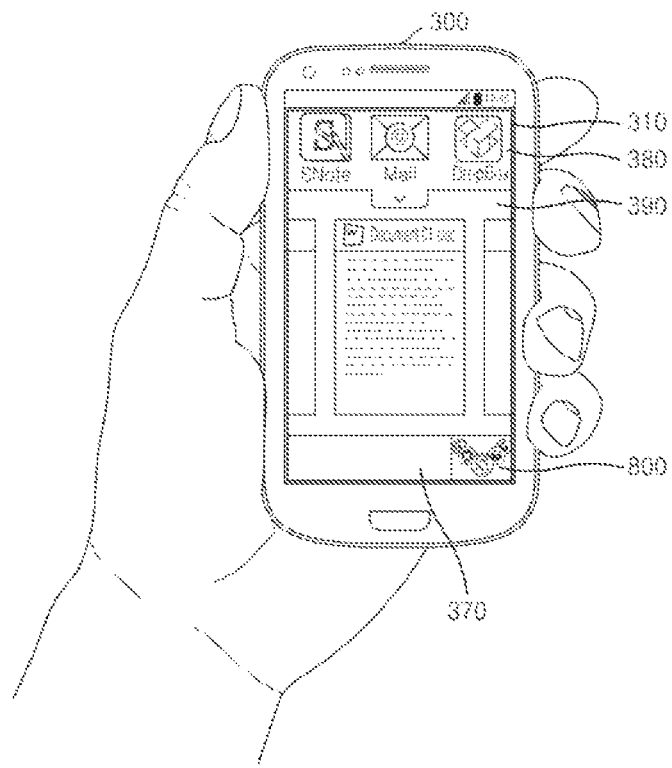
[Fig. 9C]
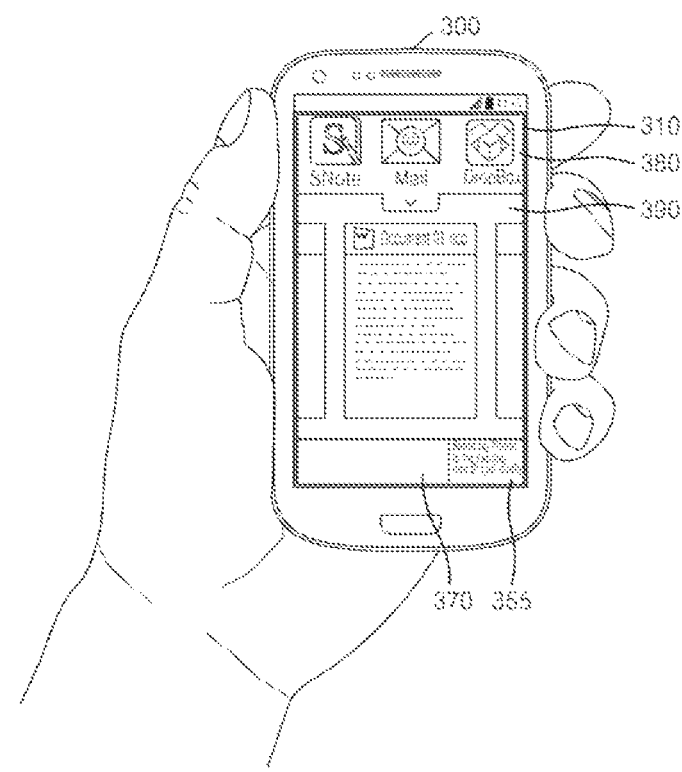

[Fig. 10A]
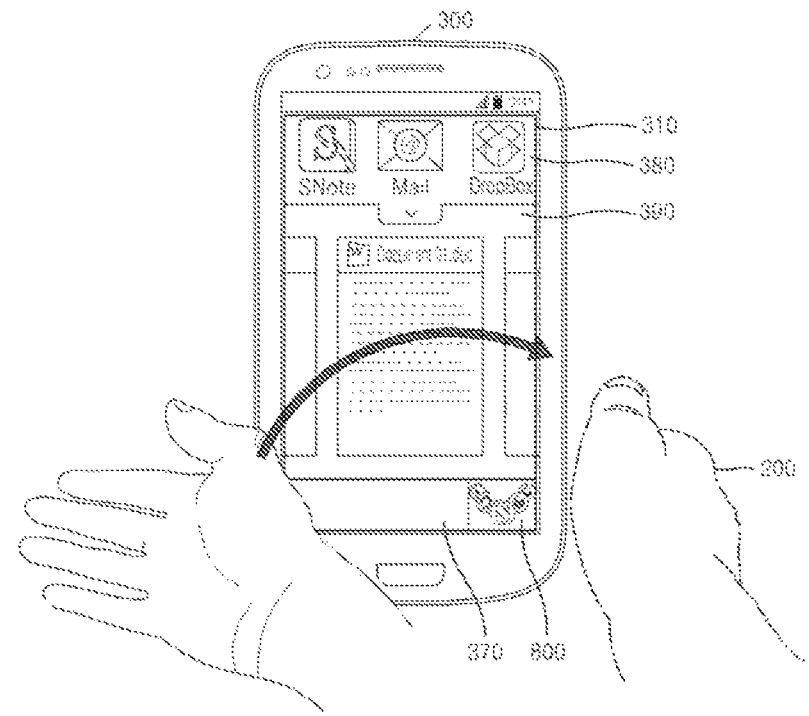
[Fig. 10B]
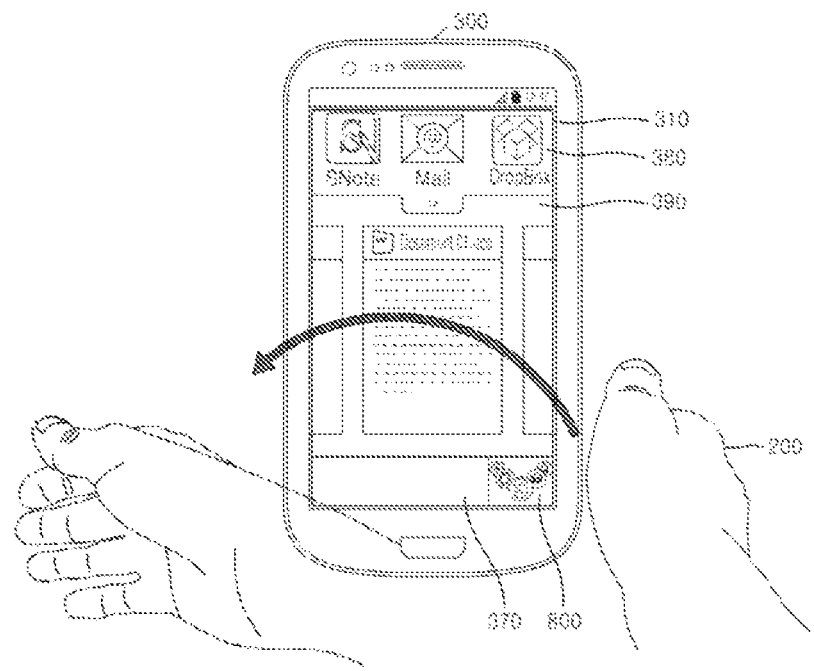

[Fig. 10C]
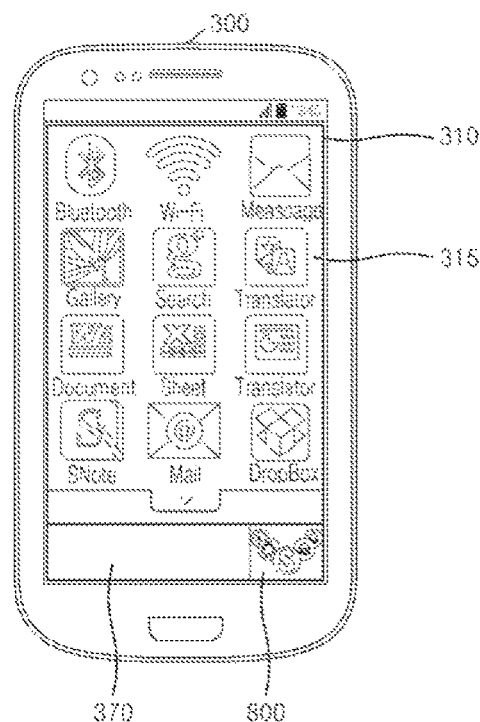
[Fig. 11]
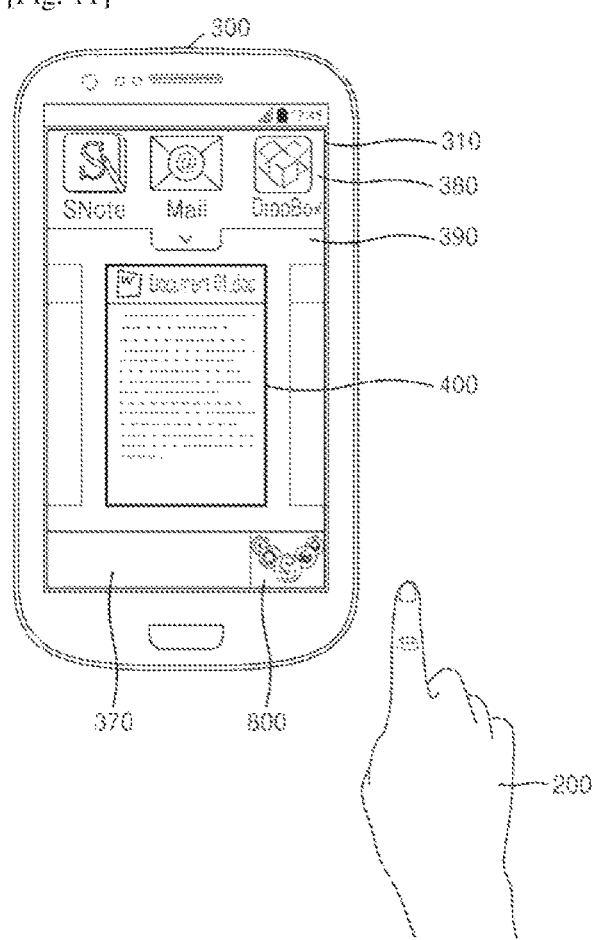

[Fig. 12]
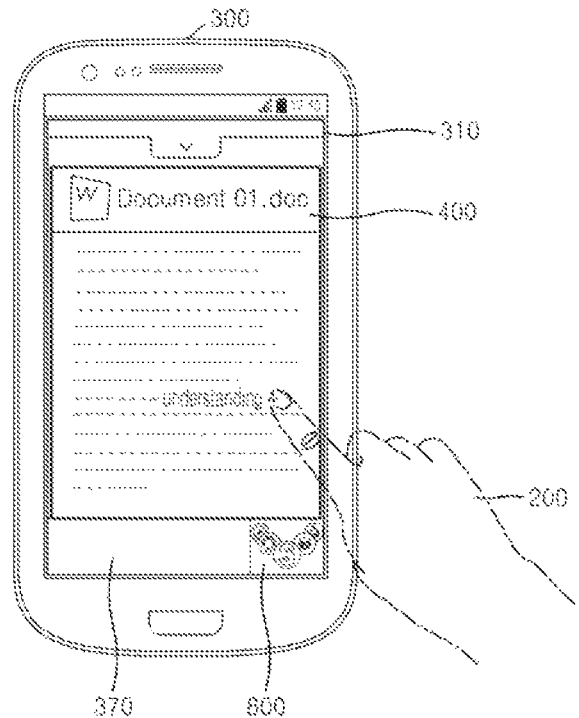
[Fig. 13]
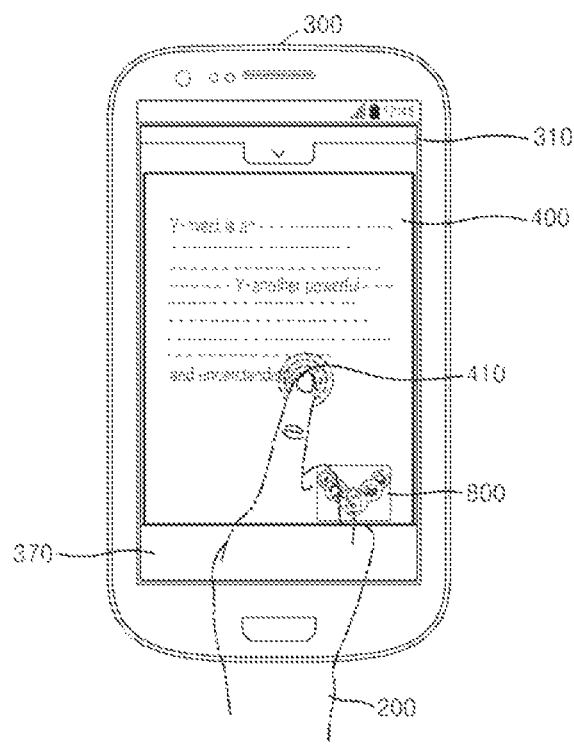

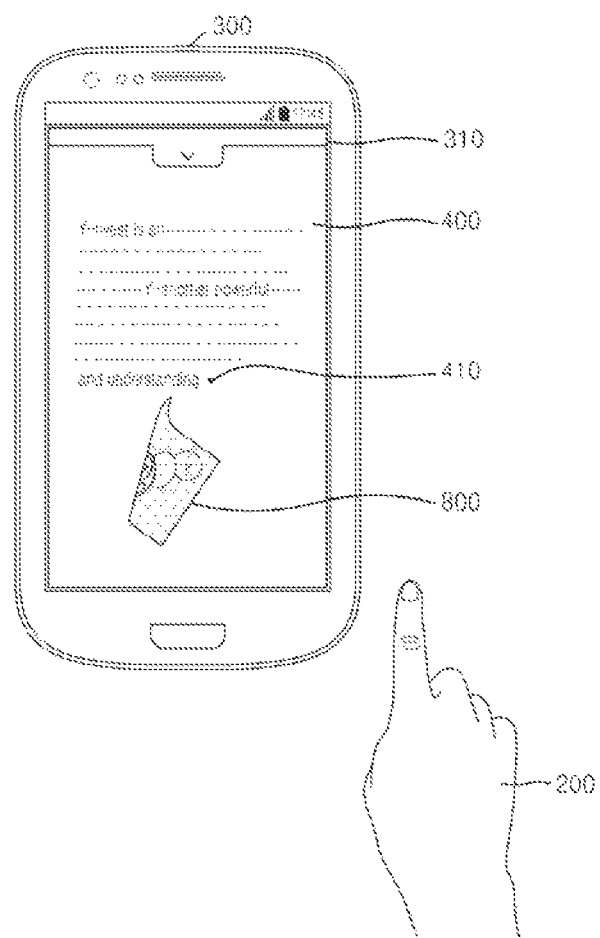
[Fig. 14]

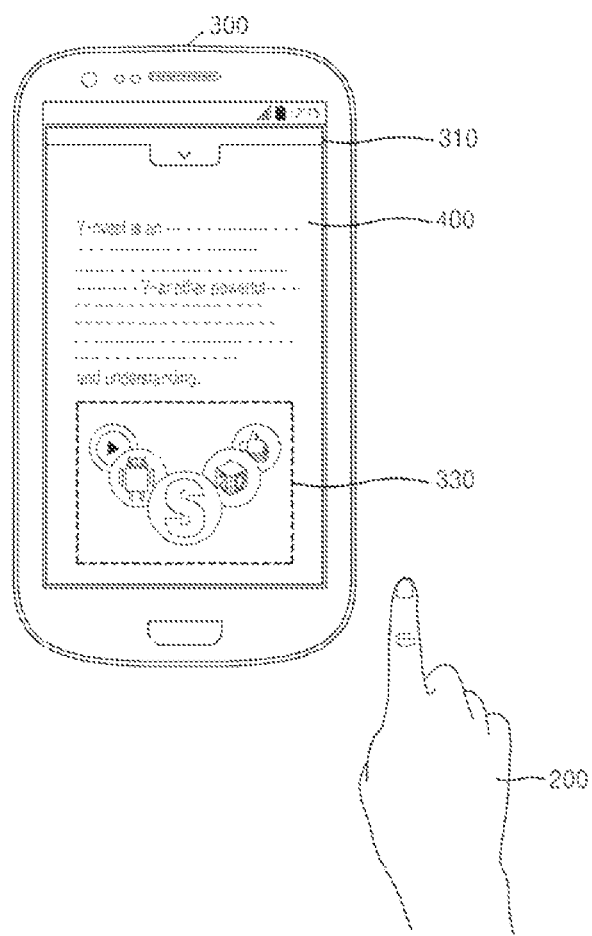
[Fig. 15]

[Fig. 16]
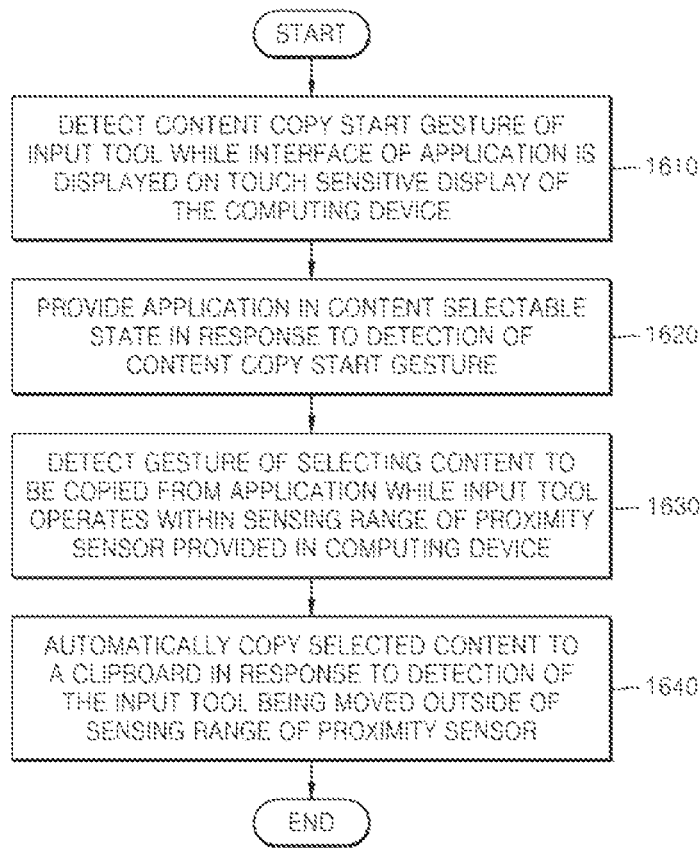
[Fig. 17]
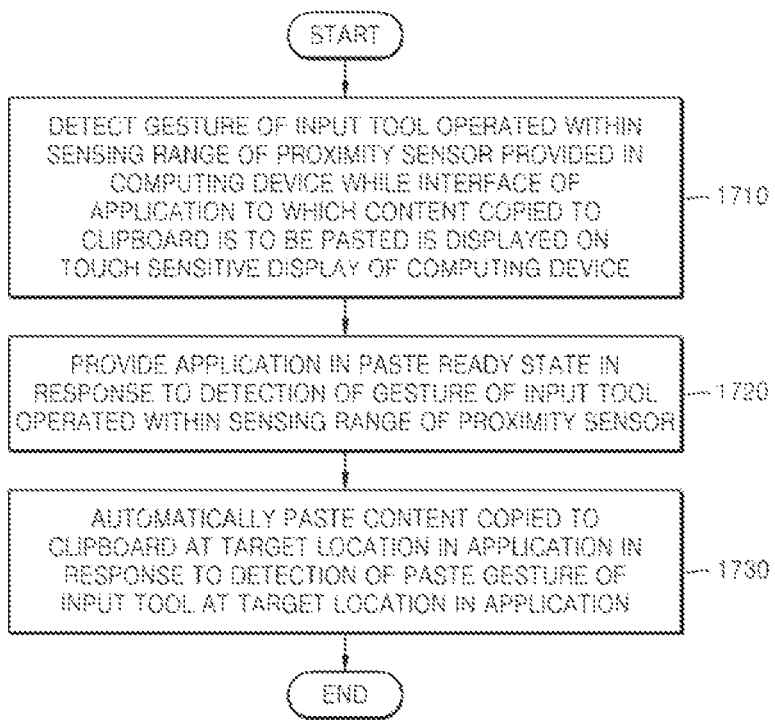

APPARATUS AND METHOD OF COPYING AND PASTING CONTENT IN A COMPUTING DEVICE

CROSS-REFERENCE TO RELATED APPLICATIONS

This application is a continuation of U.S. application Ser. No. 15/100,488 filed May 31, 2016, which is a 371 National Stage Application of International Application No. PCT/KR2014/011025 filed Nov. 17, 2014, and which claims priority under 35 U.S.C. § 119 to Korean Patent Application No. 10-2014-0003608, filed on Jan. 10, 2014, in the Korean Intellectual Property Office, the disclosures of which are incorporated by reference herein in their entirety.

TECHNICAL FIELD

Apparatus and methods consistent with exemplary embodiments relate to a method of copying and pasting content in a computing device.

BACKGROUND ART

With recent developments in information communication technology and semiconductor technology, distribution and use of various portable terminals are rapidly increasing. In particular, portable terminals, which in the past have been limited to a single function or limited functionality, have recently been developed to provide multiple functions. For example, mobile communication terminals may provide various multimedia functions such as a TV watching function (digital multimedia broadcasting (DMB), digital video broadcasting (DVB), etc.), a music playback function (MPEG audio layer-3 (MP3) files), an image capturing function, an Internet accessing function, and a dictionary searching function, in addition to their own functions such as voice calling or text messaging.

A display unit of a portable terminal is one of the output units that visually outputs information stored in the portable terminal, information received from the outside, or information input by a user. Accordingly, the display unit is a part that a user most frequently interacts with and directly impacts a user's satisfaction. Furthermore, as a multimedia function, an Internet function, or a clipboard function is added to a portable terminal, the importance and usability of the display unit is increased.

Furthermore, a touch screen display is currently widely used as a display unit and the touch screen display not only displays information to a user but also functions as an input unit for receiving input from the user. In addition to the touch screen display, a variety of types of sensors are under development for the portable terminals.

DISCLOSURE

Technical Problem

Accordingly, there is a demand for a method of copying and pasting content based on a user input in a more intuitive manner.

Technical Solution

One or more exemplary embodiments include a method of copying and pasting content in a computing device, and the computing device thereof.

Advantageous Effects

According to an exemplary embodiment, during the copying and pasting of content, an input tool within a sensing range of the proximity sensor, that is arranged in the computing device to sense an object even if the object does not touch the touch panel, is sensed by using the proximity sensor. Accordingly, the content copy and paste may be performed with an operation that is more simplified than a copy and paste operation according to the related art which only uses a touch operation.

For example, according to an exemplary embodiment of the related art, content to be copied is first selected from an application and the selected content is copied by tapping a copy menu. However, according to an exemplary embodiment which uses a proximity sensor, content to be copied is selected from an application by using an input tool and then, when the input tool moves outside of the proximity sensor range, the copy operation is automatically completed without having to tap a copy menu. Accordingly, the method of copying content according to the exemplary embodiment may provide convenience to users who use smart devices with relatively small displays, frequently use a copy operation, or use electronic whiteboards where editing operations are frequently performed.

Furthermore, in the paste operation, according to an exemplary embodiment of the related art, the paste operation is completed by tapping a location to paste content in the application to retrieve a paste menu followed by tapping the paste menu. However, according to an exemplary embodiment using the proximity sensor, while the application is displayed, by entering the input tool in the proximity sensor range and holding the input tool therein, the paste operation may be completed only using one paste gesture, for example, only one tapping operation. Accordingly, for the paste operation of the related art in which only touch is used, two touch inputs are required. However, in a case in which a proximity sensor is used, as described in the above exemplary embodiment, since the paste operation is completed using only one touch, the paste operation may be more intuitively embodied and simplified.

DESCRIPTION OF DRAWINGS

FIG. 1A is a block diagram of a computing device according to an exemplary embodiment;

FIG. 1B is a block diagram of a memory of the computing device of FIG. 1A, according to an exemplary embodiment;

FIG. 2 is a reference view illustrating a concept of copying, cutting, and pasting content in a computing device using a proximity sensor, according to an exemplary embodiment;

FIG. 3 illustrates selection of an application from which content is to be copied, in the computing device, according to an exemplary embodiment;

FIG. 4 illustrates an operation of performing a content copy start gesture on the application that is displayed on the computing device, according to an exemplary embodiment;

FIGS. 5A to 5C are views illustrating a gesture for selecting content to be copied from the application that is displayed on the computing device, according to an exemplary embodiment;

FIGS. 6A and 6B are views illustrating a gesture for editing selected content to be copied on the application that is displayed on the computing device, according to an exemplary embodiment;

FIG. 7 is a view illustrating a proximity sensor range;

FIG. 8 is a view illustrating an operation of a user's finger moving outside of a proximity sensor range after selecting content to be copied from the application that is displayed on the computing device, according to an exemplary embodiment;

FIGS. 9A to 9C illustrate interfaces that are displayed on the display of the computing device when a content copy operation is completed, according to an exemplary embodiment;

FIG. 10A to 10C illustrate examples of a gesture for selecting an application to which the content copied to a clipboard is to be pasted, according to an exemplary embodiment;

FIG. 11 illustrates an example of selecting an application to which the content copied to a clipboard is to be pasted, according to an exemplary embodiment;

FIG. 12 illustrates a state in which the user's finger enters the proximity sensor range of the computing device in order to paste the copied content, according to an exemplary embodiment;

FIG. 13 illustrates a state in which a paste operation is performed by using the user's finger, after an application to which the content copied to a clipboard is provided in a paste ready state, according to an exemplary embodiment;

FIG. 14 illustrates an animation having a visual effect in which an image having an adjusted size of a copied content displayed in a bottom portion of a display unit flies/moves to a target location of an application, according to an exemplary embodiment;

FIG. 15 illustrates a state in which, after the paste operation is completed, the content copied to a clipboard is pasted at a target location of the application provided in an interface of the display unit, according to an exemplary embodiment;

FIG. 16 is a flowchart for explaining a method of copying content in a computing device according to an exemplary embodiment; and FIG. 17 is a flowchart for explaining a method of pasting content in a computing device according to an exemplary embodiment.

BEST MODE

According to an aspect of an exemplary embodiment, a method of copying content in a computing device includes detecting a gesture of an input tool which selects content to be copied that is displayed on a display of the computing device while the input tool operates within a sensing range of a proximity sensor of the computing device, and copying the selected content to a clipboard in response to detecting removal of the input tool from within the sensing range of the proximity sensor.

According to another exemplary embodiment, the method further includes detecting a content copy start gesture of the input tool while an interface of an application is displayed on the display of the computing device; and providing the application in a content selectable state in response to the detecting of the content copy start gesture.

According to another exemplary embodiment, the content copy start gesture of the input tool comprises a long press motion or a double tap motion input using the input tool.

According to another exemplary embodiment, the method further includes cutting the selected content from the application in response to the detecting of the removal of the input tool from within the sensing range of the proximity sensor.

According to another exemplary embodiment, the detecting of the gesture which selects the content to be copied from the application further comprises detecting a gesture of the input tool which edits the selected content, and operates within the sensing range of the proximity sensor.

According to another exemplary embodiment, the copying of the selected content to the clipboard further comprises displaying an image depicting an adjusted size of the selected content at a predetermined location on the touch sensitive display of the computing device.

According to another exemplary embodiment, the displaying of the image depicting the adjusted size of the selected content at the predetermined location on the touch sensitive display further comprises providing a visual effect in which the image depicting the adjusted size of the selected content flies from an original location to the predetermined location on the touch sensitive display.

According to another exemplary embodiment, the predetermined location on the touch sensitive display is a location in a partial area of a bottom portion of the touch sensitive display.

According to another exemplary embodiment, the proximity sensor may include a capacitive touch sensitive panel.

According to another aspect of an exemplary embodiment, a method of pasting content in a computing device includes detecting a gesture of an input tool which operates within a sensing range of a proximity sensor of the computing device while an interface of an application, to which content copied to a clipboard is to be pasted, is displayed on a touch sensitive display of the computing device, switching a state of the application from a normal state in which a paste gesture of the input tool is disabled to a paste ready state in which the paste gesture of the input tool is enabled, in response to the detecting of the gesture of the input tool which operates within the sensing range of the proximity sensor, and pasting the content copied to the clipboard at a target location in the application in response to detecting the paste gesture of the input tool at the target location in the application.

According to another exemplary embodiment, the detecting of the gesture of the input tool comprises detecting an editing gesture of the input tool for editing an area to which the content copied to the clipboard is to be pasted in the application while the input tool operates within the sensing range of the proximity sensor.

According to another exemplary embodiment, the method further includes displaying an image, depicting an adjusted size of the content copied to the clipboard, at a predetermined location on the touch sensitive display.

According to another exemplary embodiment, the method further includes providing a visual effect in which the image depicting the adjusted size of the content copied to the clipboard flies from the predetermined location on the touch sensitive display to the target location in the application to which the content is to be pasted, in response to the detecting of the paste gesture of the input tool.

According to another exemplary embodiment, the proximity sensor may include a capacitive touch sensitive panel.

According to another aspect of an exemplary embodiment, computing device includes a proximity sensor, a touch sensitive display, a memory configured to store instructions, and a processor, where the processor detects a gesture of an input tool which selects content to be copied that is displayed on a display of the computing device while the input tool operates within a sensing range of a proximity sensor of the computing device; and copies the selected content to a clipboard in response to detecting removal of the input tool from within the sensing range of the proximity sensor.

According to another exemplary embodiment, the processor further detects a content copy start gesture of the input tool while an interface of the application is displayed on the display, and provides the application in a content selectable state in response to the detecting of the content copy start gesture.

According to another exemplary embodiment, the content copy start gesture of the input tool comprises a long press motion or a double tap motion of the input tool.

According to another exemplary embodiment, the processor further cuts the selected content from the application in response to the detecting of the removal of the input tool from within the sensing range of the proximity sensor.

According to another exemplary embodiment, the processor further detects an editing gesture of the input tool which edits the selected content, and operates within the sensing range of the proximity sensor.

According to another exemplary embodiment, the processor further displays an image depicting an adjusted size of the selected content at a predetermined location on the touch sensitive display.

According to another exemplary embodiment, the processor further provides a visual effect in which the image depicting the adjusted size of the selected content flies from an original location to the predetermined location in the touch sensitive display.

According to another exemplary embodiment, the predetermined location on the touch sensitive display is a location in a lower portion of the touch sensitive display.

According to another exemplary embodiment, the proximity sensor comprises a capacitive touch sensitive panel.

According to another aspect of an exemplary embodiment, a computing device includes a proximity sensor, a touch sensitive display, a memory for configured to store instructions, and a processor, where the processor is configured to detect a gesture of an input tool which operates within a sensing range of the proximity sensor of the computing device while an interface of an application, to which content copied to a clipboard is to be pasted, is displayed on the touch sensitive display, switch a state of the application from a normal state in which a paste gesture of the input tool is disabled to a paste ready state in which the paste gesture of the input tool is enabled in response to the detecting of the gesture of the input tool which operates within the sensing range of the proximity sensor, and paste the content copied to the clipboard at a target location in the application in response to detecting the paste gesture of the input tool at the target location in the application.

According to another exemplary embodiment, the processor further detects a gesture of the input tool which edits an area to which the content copied to the clipboard is to be pasted in the application while the input tool operates within the sensing range of the proximity sensor.

According to another exemplary embodiment, the processor further displays an image, depicting an adjusted size of the content copied to the clipboard, at a predetermined location on the touch sensitive display.

According to another exemplary embodiment, the processor further provides a visual effect in which the image having the adjusted size of the content copied to the clipboard flies from the predetermined location on the touch sensitive display to the target location in the application to which the content is to be pasted, in response to the detection of the paste gesture of the input tool.

According to another exemplary embodiment, the proximity sensor may include a capacitive touch sensitive panel.

According to another aspect of an exemplary embodiment, there is provided a computer readable recording medium having recorded thereon a program for executing the method of copying or pasting content.

MODE FOR INVENTION

Reference will now be made in detail to the exemplary embodiments, which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description.

The terms such as first and second in the present specification are used herein merely to describe a variety of constituent elements, but the constituent elements are not limited by the terms. The terms are used only for the purpose of distinguishing one constituent element from another constituent element without unnecessarily implying actual relationship or order between entries. For example, without departing from the right scope of the present inventive concept, a first constituent element may be referred to as a second constituent element, and vice versa. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1A is a block diagram of a computing device 100 according to an exemplary embodiment. Referring to FIG. 1A, the computing device 100 includes a touch sensitive display 101, an optical sensor 102, a proximity sensor 103, an acceleration sensor 104, an input unit 105, a bus 106, a storage 107, a memory 108, a ROM 109, a processor 110, and a communication interface 111.

The computing device 100 may be, for example, a mobile phone, a tablet device, a personal digital assistance (PDA), a smartphone, or a laptop computer, but is not limited thereto.

The touch sensitive display 101 may be, for example, a liquid crystal display (LCD), a large format display (LFD), a light emitting diode (LED), a plasma display, or a capacitive touch screen panel, which displays information processed by the computing device 100 or an image captured by the optical sensor 102, but is not limited thereto.

The optical sensor 102 captures an image of an external environment and is also used for recognizing a gesture of a user.

The proximity sensor 103 may sense a nearby target object without physical contact. The proximity sensor 103 irradiates an electromagnetic field or an electromagnetic wave, for example, an infrared ray, and senses a change in an electromagnetic field or a reflected signal, thereby detecting the nearby target object. The proximity sensor 103 includes, for example, an infrared sensor or a capacitive touch screen panel, but is not limited thereto.

A capacitive touch screen panel includes an X-Y lattice of electrodes covering a screen and is operated when a voltage is applied to the electrodes. When a finger is positioned near the electrodes, changes in capacitance occur and may be measured. An accurate position of the finger may be identified by comparing measured capacitance values of all electrodes. There are two types of capacitive sensors that are used as a touch screen. One is a mutual capacitance type sensor and the other is a self-capacitance type sensor. The mutual capacitance type sensor enables multi-touch detection. The self-capacitance type sensor, which generates a relatively stronger signal than the mutual capacitance type sensor, may accurately detect a finger that is not in contact, i.e., a finger that is hovering, with the sensor. However, the self-capacitance type sensor is unable to detect multi-touch inputs due to an effect called ghosting. However, when the mutual capacitance type sensor and the self-capacitance type sensor are simultaneously used in a single touch screen, the mutual capacitance type sensor may be used for sensing typical touch inputs such as multi-touch inputs and the self-capacitance type sensor may be used for detecting a finger that is not in contact with a surface of the screen. Accordingly, by using the capacitive touch screen panel, not only can a touch input made a user's finger be recognized, but the user's finger that is located within a predetermined range from the capacitive touch screen panel can also be detected.

The acceleration sensor 104 may sense a change in velocity per unit time, that is, a dynamic force such as acceleration, vibrations, or shocks. The computing device 100 may use the acceleration sensor to align the screen of the computing device depending on the direction in which the device is held, for example switching between portrait and landscape modes.

The input device 105 is connected to the bus 106 and transfers an input to the processor 110. The input device 105 may include, for example, a touch controller that recognizes an input such as a swipe or tap motion or a long press motion input using an input tool such as a user's finger or an interaction tool such as a stylus, a gesture controller that recognizes a pattern or gesture made using the input tool, a voice control that recognizes user's voice, or cursor direction keys. Such an input is transferred to the processor 110 and the movement of a cursor is controlled on the touch sensitive display 101. According to an exemplary embodiment, the input device 105 may be a touch screen panel or a capacitive touch screen panel and may be included in the touch sensitive display 101.

The bus 106 is a medium using which respective components of the computing device 100 may communicate with one another.

The memory 108, for example, random access memory (RAM) or another dynamic storage device, stores information to be used by the processor 110. The information may be data used by the processor 110, a command or instruction executed by the processor 110, or temporary data generated during the execution of a command or instructions. According to an exemplary embodiment, the memory 108 includes a module containing instructions for copying, cutting, and pasting content.

The ROM 109 stores static information used by the processor 110. The storage 107 may include the ROM 109 or other static storage devices. For example, the storage 107 may be a device that stores information, such as a magnetic disc or an optical disc.

The processor 110 may include an integrated electronic circuit for processing and controlling the functionality of the computing device 100.

A variety of embodiments are related to the use of the computing device 100 and embody the technology described herein. According to an exemplary embodiment, the processor 110 performs a method by using the information included in the memory 108. The information may be read from a machine-readable medium, for example, the storage 107 to the memory 108. Instructions are stored in the memory 108, according to an exemplary embodiment.

The term machine-readable medium used in the present specification denotes all media used for providing data so that a machine may operate as a particular method. According to an exemplary embodiment, various machine-readable media may be used for providing information to the processor 100. The machine-readable medium may be a storage medium. The storage medium includes both volatile and non-volatile media. The non-volatile medium may include an optical or a magnetic disc, for example, the storage 107. The volatile medium may include a dynamic memory, for example, the memory 108. All media are tangible such that a physical mechanism for reading information may detect information on the medium.

A typical form of the machine-readable medium may be, for example, floppy disks, flexible disks, hard disks, magnetic tapes, other magnetic media, CD-ROM, other optical media, punch cards, paper tapes, other physical media having a pattern of holes, RAM, PROM, EPROM, FLASH-EPROM, other memory chips, or cartridges. According to another exemplary embodiment, the machine-readable medium may be a transfer medium including coaxial cables, copper wires, and optical fibers, or a transfer medium including wires having the bus 106. The transfer medium may be in the form of radio waves or acoustic or optical waves such as waves generated during infrared data communication.

The computing device 100 may also include a communication interface 111 connected to the bus 106. The communication interface 111 provides bidirectional data communication, according to an exemplary embodiment.

FIG. 1B is a block diagram of the memory 108 of the computing device 100 of FIG. 1A. Referring to FIG. 1B, the memory 108 includes an operating system 120, at least one application 130, and at least one module 140. According to an exemplary embodiment, the memory 108 further includes a content copy/cut/paste module 150 containing instructions to copy, cut, and paste content.

The content copy/cut/paste module 150 includes, to copy content, at least one instruction to detect a content copy start gesture input by an input tool, such as a user finger or an input pen/stylus, while an application interface is displayed on the touch sensitive display 101 of the computing device 100, at least one instruction to provide an application from which a content may be selected, in response to the detection of the content copy start gesture, at least one instruction to detect a gesture of selecting the content to copy from the application while the input tool is operated within a sensing range of the proximity sensor 103 of the computing device 100, and at least one instruction to automatically copy the selected content to a clipboard, in response to the input tool being moved outside of the sensing range of the proximity sensor. Content cutting is similar to content copying. Nevertheless, the content cutting may be performed by further including an instruction to cut/remove the selected content from the application.

Furthermore, to paste the copied content, the content copy/cut/paste module 150 may include at least one instruction to detect a gesture input by the input tool which stays within the sensing range of the proximity sensor 103 of the computing device 100 while an application interface to paste the content copied to the clipboard is displayed on the touch sensitive display 101 of the computing device 100, at least one instruction to provide an application in a state in which content may be pasted, in response to the detection of a gesture input of the input tool while the input tool remains within the sensing range of the proximity sensor 103, and at least one instruction to automatically paste the content copied to the clipboard to a target location in the application in response to the detection of a paste gesture input of the input tool at the target location in the application.

FIG. 2 is a reference view illustrating a concept of copying, cutting, and pasting content in a computing device using a proximity sensor, according to an exemplary embodiment.

When the computing device 100 includes the proximity sensor 103, the computing device 100 may detect an input tool 200 that operates within a proximity sensor range, that is, the sensing range of the proximity sensor 103. Although in FIG. 2 a user's finger is illustrated as the input tool 200, any device that can be sensed by the proximity sensor 103 can be used. For example, a pen-type/stylus interaction tool may be used as the input tool 200.

Also, the proximity sensor range denotes a range in which the proximity sensor 103 senses a nearby object. The proximity sensor range may vary according to the proximity sensor 103 incorporated in the computing device 100. For example, for a capacitive touch screen panel, it is known that a range of sensing an object without a physical contact is about 2 centimeters from the capacitive touch screen panel.

According to an exemplary embodiment, the computing device 100 includes a proximity sensor 103 and, in order to copy content, as the input tool 200 is moved outside of the application interface and outside the proximity sensor range after content to copy has already been selected in an application interface displayed on the touch sensitive display 101, the selected content is automatically copied to a clipboard. Accordingly, an additional operation of the input tool 200 is not required to copy content when the content intended to be copied is selected by a user. In other words, the selected content is copied by simply moving the input tool 200 outside of the proximity sensor range without having to perform any additional operation. Accordingly, the copying of the content may be performed by a simplified gesture. The cutting of content may similarly be performed as the copying of content described above. However, an operation to delete/remove the selected content from the application is added to the process of cutting content.

According to an exemplary embodiment, the computing device 100 includes a proximity sensor 103 and, in order to paste copied content, as the input tool 200 operates within the proximity sensor range in the application interface, to which the content is to be pasted and which is displayed on the touch sensitive display 101 of the computing device 10, an application is activated to be in a paste ready state. When the input tool 200 is used to perform a tap operation while the application is activated in a paste ready state, the content copied to the clipboard is pasted to the application. Accordingly, in an application to which content is to be pasted, the application is activated whenever the input tool 200 operates within the proximity sensor range and a paste operation is performed by a tap operation at a paste position. Thus, a user may perform a paste operation by a one-time tap operation at the paste position, thereby performing the contents paste operation with a simplified gesture.

A method of copying and pasting content in the computing device 300, according to an exemplary embodiment, will now be described with reference to FIGS. 3 to 15. FIG. 3 illustrates that an application from which content is to be copied is selected in the computing device 300. Referring to FIG. 3, the computing device 300 includes a proximity sensor according to the above described exemplary embodiment. Although FIG. 3 does not illustrate the proximity sensor, the proximity sensor is a capacitive touch screen panel according to the exemplary embodiment. A document 320 is provided in a display unit 310 of the computer device 300 as an application interface for copying content. The document 320 includes an image 330 and text 340. Any application that is configured to be able to copy or edit content may be used as the application from which content is to be copied. Furthermore, although FIG. 3 illustrates the input tool 200 as a user's finger for selecting content to copy from the application, any input tool that can be sensed by the capacitive touch screen panel, that is, by the proximity sensor, may be used as the input tool 200.

FIG. 4 illustrates an operation of performing a content copy start gesture on the application that is displayed on the computing device 300. Referring to FIG. 4, as a user performs a content copy start gesture using the input tool 200 by hovering the input tool 200 over the display unit 310 of the computing device 300 on which the application interface is displayed, the application 320 displayed on the display unit 310 may move to a content copy ready state. In other words, when the content copy start gesture of the input tool 200 is detected during a state in which the application is displayed on the display unit 310, the computing device 300 changes the state of the application displayed on the display unit 310 to a content copy ready state. Although the content copy start gesture, for example, includes an operation of long-pressing or double-tapping the display unit 310, it is not limited thereto.

FIGS. 5A to 5C are views illustrating a gesture for selecting content to be copied from an application interface that is displayed on the computing device 300. FIG. 5A illustrates an example of selecting an image from the application interface that is displayed on the computing device 300. FIGS. 5B and 5C illustrate selecting text from the application interface that is displayed on the computing device 300.

Referring to FIG. 5A, a user inputs a gesture by moving the input tool 200 along an outline of the image 330, thereby selecting desired content to copy in the application that is displayed on the computing device 300. The gesture for selecting content to be copied in the application may be any type of selection gesture as long as the input tool 200 is moved within a sensing range of the proximity sensor of the computing device 300, for example, the sensing range of the capacitive touch screen panel. The gesture for selecting content to copy from the application may include, for example, a touch input along the outline of the image 330, such that the input tool 200 hovers above the capacitive touch sensitive panel and along the outline of the image 330 without touching the capacitive touch sensitive panel, or simply tapping the image 330, it is not limited thereto. According to an exemplary embodiment, content is automatically copied when it is detected that the input tool 200 is moved outside of the proximity sensor range after the content is selected in a content selectable state. Thus, any type of content selection gesture may be used and detected only when the input tool 200 operates within the proximity sensor range.

Referring to FIG. 5B, in the application that is displayed on the computing device 300, the user inputs a gesture by using the input tool 200 to select text 340. The method of selecting text from the application may be performed by, for example, an operation of tapping a start position of desired text and dragging with the input tool 200 across the desired text, it is not limited thereto. Referring to FIG. 5C, desired text 350 to be copied is selected using the input tool 200.

FIGS. 6A and 6B are views illustrating a gesture for editing the selected content that is to be copied to the application that is displayed on the computing device 300. Referring to FIG. 6A, the user inputs an editing gesture of touching two points of the image 330 that is selected from the application and moving the input tool 200 in a direction to reduce the size of the image 330. Referring to FIG. 6B, the image 330 with its size reduced by the editing gesture is illustrated as an image 360.

As described above, according to an exemplary embodiment, the selected content is automatically copied to the clipboard when it is detected that the input tool 200 moves outside of the proximity sensor range after the content is selected from the application. Thus, the user may edit the selected content by using the input tool 200 when the input tool 200 operates within the proximity sensor range. When the input tool 200 moves outside of the proximity sensor range, the edited content is automatically copied to the clipboard.

FIG. 7 is a view illustrating the proximity sensor range. Referring to FIG. 7, while the input tool 200 moves within the proximity sensor range of the computing device 300, that is, a sensing range of the proximity sensor of the computing device 300, an automatic copy event may be triggered when the computing device 300 detects the gesture for selecting content to copy and detects that the input tool 200 moves outside of the proximity sensor range. The automatic copy event is an operation of automatically copying content selected from the application to the clipboard. Accordingly, before the automatic copy event is triggered, that is, while the inputter 200 moves within the proximity sensor range, the user may freely input a gesture of selecting and editing content in the application by using the input tool 200. When a capacitive touch sensitive panel is used as the proximity sensor, since a sensing range of the capacitive touch sensitive panel is known to be about 2 centimeters, the user may input a gesture of selecting and editing content within a proximity of about 2 centimeters from the capacitive touch sensitive panel, according to an exemplary embodiment.

FIG. 8 is a view illustrating an operation of moving the input tool 200 outside of the proximity sensor range after selecting content to be copied from the application that is displayed on the computing device 300. Referring to FIG. 8, as described above with reference to FIGS. 5A to 5C, when the user selects content to copy from the application 320 that is displayed in the computing device 300, if the user inputs a gesture in which the input tool 200 moves outside of the proximity sensor range, the proximity sensor of the computing device 300 detects the gesture and the computing device 300 automatically copies the content to the clipboard in response to the detection of the gesture.

According to the above operation, while copying the content, the input tool 200 operates within the sensing range of the proximity sensor and is detected by using the proximity sensor arranged in the computing device 300, that is, the proximity sensor that is capable of detecting an object even if the object does not in contact with the touch panel. Accordingly, the content may be copied by an operation that is more simplified than an existing copy operation which uses only touch operations.

According to an exemplary embodiment of the related art, content to be copied is selected from an application and the selected content is copied by tapping a copy menu. However, according to an exemplary embodiment which uses a proximity sensor, content to be copied is selected from an application by using an input tool 200 which is simply required to move outside of the proximity sensor range to complete a copy operation without having to tap a copy menu. Accordingly, the method of copying content according to the exemplary embodiment may provide convenience to users who use smart devices with relatively small displays, frequently use a copy operation, or use electronic whiteboards where editing operations are frequently performed.

Also, in order for a user to be able to intuitively acknowledge a state of content being copied to the clipboard, the display unit 310 of the computing device 300 may be provided with an interface providing a predetermined visual effect. The visual effect may include an animation in which an image 800 of the content selected to be copied flies/moves to a predetermined location on the display unit 310, for example, a partial area of a bottom portion 370 of the display unit 310, in response to the detection that the input tool 200 moving outside of the proximity sensor range, as illustrated in FIG. 8. The visual effect is not limited to the one illustrated in FIG. 8 and a variety of animations may be employed.

FIGS. 9A to 9C illustrate interfaces that are displayed on the display of the computing device 300 when a content copy operation is completed. Referring to FIG. 9A, when a user selects content to copy from the application 320 that is displayed in the computing device 300 and then the input tool 200 moves outside the proximity sensor range, the content 330 of the application 320 is copied to the clipboard and the application 320 continues to be displayed on the display unit 310 of the computing device 300. However, to intuitively show that the content 330 is copied to the clipboard, the image 800 having an adjusted size of the content 330 is displayed in a partial area of the bottom portion 370 of the display unit 310.

Referring to FIG. 9B, when the user uses the input tool 200 to select content to copy from the application 320 that is displayed in the computing device 300 and then the input tool 200 moves outside of the proximity sensor range, the content 330 of the application 320 is copied to the clipboard and an interface showing a list of applications may be displayed on the display unit 310 of the computing device 300. The interface displayed on the display unit 310 of the computing device 300 may be divided, for example, into three parts. Referring to FIG. 9B, the interface displayed on the display unit 310 of the computing device 300 includes a heading portion 380 where a list of icons indicating applications is displayed, a body portion 390 showing documents belonging to a selected application, and a bottom portion 370 showing the image 800 having an adjusted size of the content currently copied to the clipboard.

Like FIG. 9B, FIG. 9C illustrates an example of an interface in which the input tool 200 is moved outside of the proximity sensor range, the content 330 of the application 320 is copied to the clipboard, and a list of applications are shown on the display unit 310 of the computing device 300. However, when the content copied from the application 320 is text, as illustrated in FIG. 5C, the copied content, that is, an image 355 having an adjusted size of text 350, may be displayed in the bottom portion 370 of the interface displayed on the display unit 310, as shown in FIG. 9C. Accordingly, if it is difficult for the entire copied text to be displayed in the size adjusted image, only a part of the copied text may be displayed.

FIGS. 10A to 10C illustrate examples of a gesture for selecting an application to which the content copied to a clipboard is to be pasted. FIG. 10A illustrates an example of selecting an application by making a spatial gesture above the display unit 310 of the computing device 300, when an application list is displayed on the display unit 310 of the computing device 300. Referring to FIG. 10A, when a user inputs an air gesture or swiping gesture by moving a user's hand/input tool 200 from left to right, for example, an optical sensor provided in the computing device 300 senses the air gesture. Based on the sensing, applications displayed in the application list are moved from left to right, that is, for example, an application located at the left of the currently displayed application list, may be displayed on the display unit 310.

Referring to FIG. 10B, when a user inputs an spatial gesture or swiping gesture by moving a user's hand/input tool 200 from right to left, for example, an optical sensor provided in the computing device 300 senses the spatial gesture. Based on the sensing, applications displayed in the application list are moved from right to left, that is, for example, an application located at the right of the currently displayed application list, may be displayed on the display unit 310.

FIG. 10C illustrates an example of selecting an application from a main menu 315 displayed on the display unit 310 of the computing device 300. In the main menu 315, an application may be selected, for example, by tapping or double tapping a particular icon.

FIG. 11 illustrates an example of selecting an application to which the content copied to a clipboard is to be pasted. Referring to FIG. 11, a file Document 01.DOC, which is an application 400 to which the content copied to a clipboard is to be pasted, is displayed in the interface of the display unit 310 of the computing device 300, and an image 800 having an adjusted size of the content copied to the clipboard is displayed in the bottom portion 370 of the interface of the display unit 310 of the computing device 300. The input tool 200 has not yet enter the proximity sensor range of the computing device 300, according to the exemplary embodiment. The application to which content is to be pasted is not limited thereto and any application configured to paste or edit content may be used.

FIG. 12 illustrates a state in which the user's finger enters the proximity sensor range of the computing device 300 in order to paste the copied content. Referring to FIG. 12, in a state in which the file Document 01.DOC is displayed in the application 400 to which the copied content is to be pasted in the interface on the display unit 310 of the computing device 300, the user moves the input tool 200 such that the input tool 200 enters the proximity sensor range of the computing device 300 and remains therein. When the proximity sensor of the computing device 300 senses a gesture that is input by using the input tool 200 while the input tool 200 is within the proximity sensor range of the computing device 300, the computing device 300 changes the state of the application 400 to a paste ready state. In other words, the computing device 300 activates the application 400 such that the application 400 enters an activated state in which a paste option is possible. Furthermore, in order for the proximity sensor of the computing device 300 to sense the gesture that is input using the input tool 200 while the input tool 200 operates within the proximity sensor range of the computing device 300, it is sufficient for the input tool 200 to operate within the proximity sensor range even for a short time.

FIG. 13 illustrates a state in which a paste operation is performed by using the input tool 200, after an application to which the content copied to the clipboard is to be pasted is provided in a paste ready state. Referring to FIG. 13, when the user inputs a paste gesture by using the input tool 200 at a target location 410 in the application 400, the computing device 300 detects the paste gesture input by using the input tool 200 and, in response to the detection of the paste gesture, automatically adds the content copied in the clipboard to the target location 410 of the application 400. The paste gesture of the input tool 200 includes, for example, a tap motion, but is not limited thereto. FIG. 13 illustrates that the input tool 200 inputs the paste gesture at a position next to a word understanding in the text of the application 400. Accordingly, the copied content is inserted at the position next to the word understanding in the text of the application 400.

As such, as the input tool 200 simply enters the proximity sensor range and remains therein, providing an application paste ready state, and then the paste operation is completed by the user's paste gesture, for example, a tap motion, necessary operations may be simplified compared to the paste operation in the related art which employs merely the press motion. For example, according to an exemplary embodiment of the related art, the paste operation is completed by performing a taping operation at the target location in the application to paste content and then tapping a menu paste. However, according to the exemplary embodiment described above using the proximity sensor, when the input tool 200 enters the proximity sensor range and remains therein, the paste operation may be completed by merely preparing the content paste operation and inputting a paste gesture, for example, tapping once, at the target location.

Furthermore, to provide a visual effect informing the user that the content copied to the clipboard is added to the target location of the application 400, an animation in which the image 800 having an adjusted size of the copied content displayed in the bottom portion 370 of the display unit 310 flies/moves to the target location 410 of the application 400 may be provided. Referring to FIG. 13, the image 800 having an adjusted size of the copied content flies/moves to the target location 410 away from the bottom portion 370.

FIG. 14 illustrates an animation having a visual effect in which the image 800 having an adjusted size of a copied content displayed in the bottom portion 370 of the display unit 310 flies/moves to the target location 410 of the application 400. The animation may allow the user to more intuitively acknowledge that the user's content paste gesture is recognized and that a paste operation is being performed in the computing device 300.

FIG. 15 illustrates a state in which, after the paste operation is completed, the content copied (image 330) to the clipboard is pasted at the target location 410 of the application 400 provided in the interface of the display unit 310.

FIG. 16 is a flowchart explaining a method of copying content in a computing device according to an exemplary embodiment. Referring to FIG. 16, in operation 1610, while an interface of an application is displayed on a touch sensitive display of a computing device, the computing device detects a content copy start gesture by an input tool. The input tool may be a user's finger or a stylus/input pen, but is not limited thereto. Any type of an interaction tool that the touch sensitive display responds to may be used as the input tool. The content copy start gesture may include, for example, a double tap motion or a long press motion on the touch sensitive display, but is not limited thereto.

In Operation 1620, the computing device, in response to the detection of the content copy start gesture, provides the application in a content selectable state. The providing of the application in the content selectable state means to activate the application to be in a state in which a content of the application is selectable.

In Operation 1630, while the input tool operates within a sensing range of a proximity sensor provided in the computing device, the computing device detects a gesture for selecting content to be copied from the application. The gesture for selecting content to be copied from the application may be a touch or a spatial gesture. The gesture may be detected by a variety of methods according to the type of sensor provided in the computing device. Unless the input tool moves outside of the sensing range of the proximity sensor, the computing device detects the gesture input by the input tool operating in the proximity sensor range so that a gesture for editing the content may be detected after the content is selected. The content editing gesture may include, for example, a gesture for adjusting a size of the selected contents, but is not limited thereto.

The proximity sensor provided in the computing device may be an infrared sensor or a capacitive touch screen panel, but is not limited thereto. When the capacitive touch screen panel is used as the proximity sensor, the proximity sensor and a display unit may be used in an integrated form.

In Operation 1640, in response to detecting that the input tool has moved outside of the sensing range of the proximity sensor, the computing device automatically copies the selected content to a clipboard. Also, the computing device may provide a predetermined visual effect to allow a user to intuitively acknowledge that the selected content is copied to the clipboard. For example, in response to detecting that the input tool has moved outside of the sensing range of the proximity sensor, the computing device may display an image having an adjusted size of the content selected from the application at a predetermined location on the display unit. Also, the computing device may provide an animation in which the image having an adjusted size of the content selected from the application flies/moves from its original location to a predetermined location of the display unit.

Furthermore, a content cut operation is similar to the content copy operation. However, since the content selected from the application needs to be removed from the application in a cut operation, an operation of cutting/removing/deleting the selected content from the application is performed together with the operations of FIG. 16 in a content cut operation.

FIG. 17 is a flowchart explaining a method of pasting content in a computing device according to an exemplary embodiment. Referring to FIG. 17, first, in Operation 1710, while an interface of an application to paste content copied to the clipboard is displayed on a touch sensitive display of a computing device, the computing device detects a gesture of an input tool which operates within a sensing range of a proximity sensor provided in the computing device. To show the user that the content is copied to the clipboard, an image having an adjusted size of the content copied to the clipboard may be displayed at a predetermined location on a display unit. The predetermined location of the display unit may be a partial area at the bottom portion of the display unit, but is not limited thereto.

In Operation 1720, in response to the detection of the gesture input by the input tool which operates within the sensing range of the proximity sensor, the computing device changes the state of the application to a paste ready state. In other words, providing the application in the paste ready state means activating the application to be in a state in which content copied to the clipboard may be pasted. The sensing range of the proximity sensor may vary according to the type of a proximity sensor. For example, for a capacitive touch sensitive panel, a range of sensing a nearby object is known to be about 2 centimeters from the capacitive touch sensitive panel.

In Operation 1730, in response to the detection of the paste gesture input using the input tool at a target location in the application, the computing device automatically pastes the content copied to the clipboard to the target location of the application. The paste gesture input using the input tool may include, for example, a tap motion, but is not limited thereto. Also, the computing device may provide a predetermined visual effect to allow a user to intuitively acknowledge that the content copied to the clipboard is pasted to the target location. For example, the computing device may provide an animation having a visual effect in which an image having an adjusted size of the copied content that is displayed at a predetermined location on a display unit flies/moves to the target location of the application.

As described above, according to an exemplary embodiment, during the copying and pasting of content, an input tool within a sensing range of the proximity sensor, that is arranged in the computing device to sense an object even if the object does not touch the touch panel, is sensed by using the proximity sensor. Accordingly, the content copy and paste may be performed with an operation that is more simplified than a copy and paste operation according to the related art which only uses a touch operation.

For example, according to an exemplary embodiment of the related art, content to be copied is first selected from an application and the selected content is copied by tapping a copy menu. However, according to an exemplary embodiment which uses a proximity sensor, content to be copied is selected from an application by using an input tool and then, when the input tool moves outside of the proximity sensor range, the copy operation is automatically completed without having to tap a copy menu. Accordingly, the method of copying content according to the exemplary embodiment may provide convenience to users who use smart devices with relatively small displays, frequently use a copy operation, or use electronic whiteboards where editing operations are frequently performed.

Furthermore, in the paste operation, according to an exemplary embodiment of the related art, the paste operation is completed by tapping a location to paste content in the application to retrieve a paste menu followed by tapping the paste menu. However, according to an exemplary embodiment using the proximity sensor, while the application is displayed, by entering the input tool in the proximity sensor range and holding the input tool therein, the paste operation may be completed only using one paste gesture, for example, only one tapping operation. Accordingly, for the paste operation of the related art in which only touch is used, two touch inputs are required. However, in a case in which a proximity sensor is used, as described in the above exemplary embodiment, since the paste operation is completed using only one touch, the paste operation may be more intuitively embodied and simplified.

Another exemplary embodiment can also be a computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

It should be understood that the exemplary embodiments described herein should be considered in a descriptive sense only and not for purposes of limitation. Descriptions of features or aspects within each embodiment should typically be considered as available for other similar features or aspects in other embodiments. Also, the description of the exemplary embodiments is intended to be illustrative, and not to limit the scope of the claims, and many alternatives, modifications, and variations will be apparent to those skilled in the art.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a proximity sensor configured to detect an input tool without physical contact;
   a touch sensitive display;
   a memory configured to store instructions; and
   a processor,
   wherein the processor is configured to:
   detect a first gesture of the input tool to select content to be copied that is displayed on the touch sensitive display while the input tool is maintained within a sensing range of the proximity sensor, the first gesture being a gesture of moving within the sensing range of the proximity sensor without physical contact to the touch sensitive display;
   detect a second gesture of the input tool leaving the sensing range of the proximity sensor in a state in which the content is selected by the first gesture of the input tool; and
   based on detecting the input tool leaving the sensing range of the proximity sensor, display an interface and trigger an automatic copy operation to copy the selected content to a clipboard, the selected content being copied to the clipboard for a future paste operation,
   wherein the first gesture to move within the sensing range of the proximity sensor without physical contact and the second gesture subsequent to the first gesture to leave from the sensing range of the proximity sensor complete selection and copying of the content, and
   wherein the interface comprises a heading portion where a list of icons indicating applications to which the copied content may be pasted, a body portion showing documents belonging to a selected application to which the copied content may be pasted, and a bottom portion showing an image indicating the content that has been copied to the clipboard.

2. The electronic device of claim 1, wherein the processor is further configured to cut the selected content from an application based on detection of the input tool being removed from within the sensing range of the proximity sensor.

3. The electronic device of claim 1, wherein the processor is further configured to copy the selected content to the clipboard any time the input tool is removed from the sensing range of the proximity sensor while the content to be copied is selected.

4. The electronic device of claim 1, wherein the processor is further configured to control display of an animation of the selected content moving to a predetermined location on the touch sensitive display.

5. The electronic device of claim 1, wherein the processor is further configured to:
   detect a content copy start gesture of the input tool while an application interface of an application is displayed on the touch sensitive display;
   change a state of the application to a content selectable state based on detection of the content copy start gesture; and
   detect the first gesture of the input tool to select the content to be copied while the state of the application is the content selectable state.

6. The electronic device of claim 5, wherein the content copy start gesture of the input tool comprises a long press motion or a double tap motion of the input tool, and the first gesture of the input tool to select the content to be copied is detected after the content copy start gesture of the input tool.

7. The electronic device of claim 5, wherein the processor is further configured to monitor whether the input tool is removed from the sensing range of the proximity sensor while detecting the first gesture of the input tool to select the content to be copied, and while the state of the application is the content selectable state.

8. A method of copying content in an electronic device, the method comprising:
   detecting a first gesture of an input tool to select content to be copied that is displayed on a touch sensitive display of the electronic device while the input tool is maintained within a sensing range of a proximity sensor of the electronic device that is configured to detect the input tool without physical contact, the first gesture being a gesture of moving within the sensing range of the proximity sensor without physical contact to the touch sensitive display;
   based on selection of the content to be copied, detecting a second gesture of the input tool leaving the sensing range of the proximity sensor in a state in which the content is selected by the first gesture of the input tool; and
   based on detecting the input tool leaving the sensing range of the proximity sensor and the content to be copied being selected, displaying an interface and triggering an automatic copy operation to copy the selected content to a clipboard, the selected content being copied to the clipboard for a future paste operation, and
   wherein the first gesture to move within the sensing range of the proximity sensor without physical contact and the second gesture subsequent to the first gesture to leave from the sensing range of the proximity sensor complete selection and copying of the content, and
   wherein the interface comprises a heading portion where a list of icons indicating applications to which the copied content may be pasted, a body portion showing documents belonging to a selected application to which the copied content may be pasted, and a bottom portion showing an image indicating the content that has been copied to the clipboard.

9. The method of claim 8, further comprising cutting the selected content from an application based on the detecting of the input tool being removed from within the sensing range of the proximity sensor.

10. The method of claim 8, further comprising:
    detecting a content copy start gesture of the input tool while an application interface of an application is displayed on the display of the electronic device;
    changing a state of the application to a content selectable state based on the detecting of the content copy start gesture; and detecting the first gesture of the input tool to select the content to be copied while the state of the application is the content selectable state.

11. The method of claim 10, wherein the content copy start gesture of the input tool comprises a long press motion or a double tap motion input using the input tool.

12. A method of pasting content in an electronic device, the method comprising:
   displaying, while content is copied to a clipboard, a list of icons indicating a plurality of applications to which the copied content may be pasted;
   detecting, while the content is copied to the clipboard, a target selection gesture to modify display of the list of icons and select an application from among the plurality of applications, the target selection gesture being performed within an optical sensing range of an optical sensor of the electronic device and beyond a sensing range of a proximity sensor of the electronic device;
   detecting a gesture of an input tool which operates within the sensing range of the proximity sensor while an interface of the application selected by the target selection gesture, to which the content copied is to be pasted, is displayed on a touch sensitive display of the electronic device;
   switching a state of the application from a normal state in which a paste gesture of the input tool is disabled to a paste ready state in which the paste gesture of the input tool is enabled, based on the detecting of the gesture of the input tool which operates within the sensing range of the proximity sensor; and
   pasting the content copied to the clipboard at a target location in the application based on detecting the paste gesture of the input tool at the target location in the application,
   wherein the content is copied to the clipboard based on detecting the input tool being removed from the sensing range of the proximity sensor.

13. The method of claim 12, wherein the detecting of the gesture of the input tool comprises detecting an editing gesture of the input tool for editing an area to which the content copied to the clipboard is to be pasted in the application while the input tool operates within the sensing range of the proximity sensor.

14. The method of claim 12, further comprising:
   detecting a selection gesture of the input tool to select the content while the input tool is maintained within the sensing range of the proximity sensor of the electronic device;
   based on selection of the content, detecting whether the input tool is removed from the sensing range of the proximity sensor; and
   based on the input tool being removed from the sensing range of the proximity sensor and the content being selected, copying the selected content to the clipboard.

15. The method of claim 12, further comprising displaying an image, depicting an adjusted size of the content copied to the clipboard, at a predetermined location on the touch sensitive display.

16. The method of claim 15, further comprising providing a visual effect in which the image depicting the adjusted size of the content copied to the clipboard flies from the predetermined location on the touch sensitive display to the target location in the application to which the content is to be pasted, in response to the detecting of the paste gesture of the input tool.

* * * * *